E. SKELLY.
Evaporating Pan.
No. 25,052.
Patented Aug. 9, 1859.
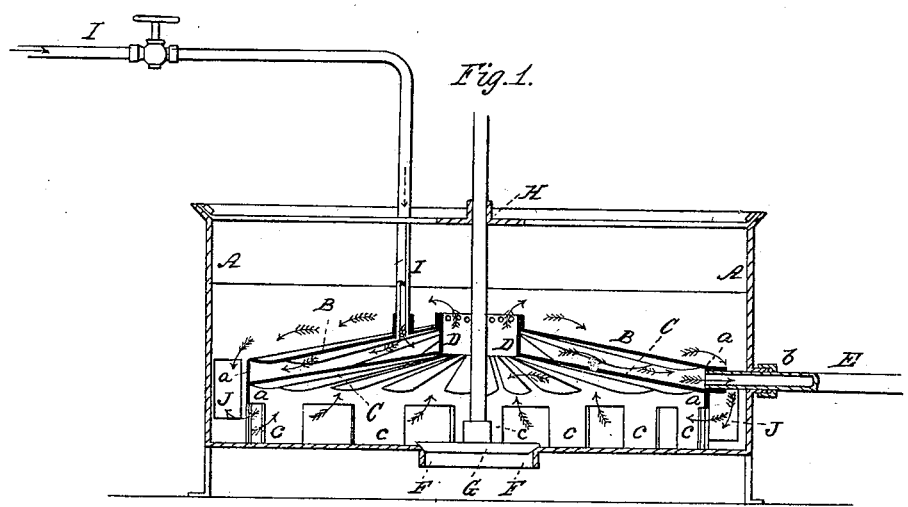
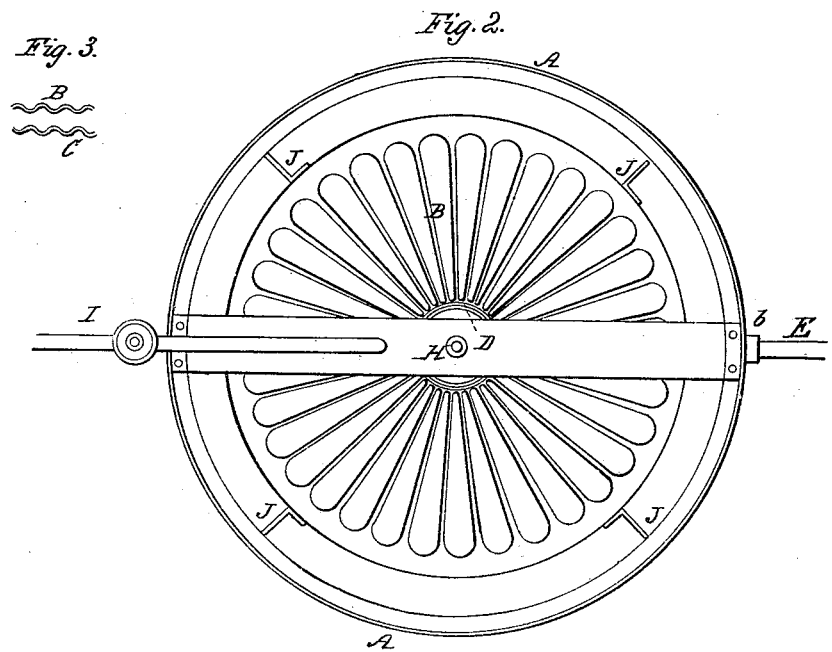
Witnesses:
Inventor:

UNITED STATES PATENT OFFICE.

EVAN SKELLY, OF PLAQUEMINE, LOUISIANA.

IMPROVEMENT IN APPARATUS FOR HEATING EVAPORATING-PANS.

Specification forming part of Letters Patent No. 25,052, dated August 9, 1859.

*To all whom it may concern:*

Be it known that I, EVAN SKELLY, of Plaquemine, in the parish of Iberville and State of Louisiana, have invented a new and useful Improvement in Evaporating-Pans for Cane-Juice and other Liquids or Solutions; and I hereby declare that the following is a full, clear, and exact description of the same, reference being had to the accompanying drawings, forming part of this specification, in which—

Figure 1 is a central vertical section of a pan with my improvement. Fig. 2 is a plan of the same. Fig. 3 is a transverse vertical section of part of the heater.

Similar letters of reference indicate corresponding parts in the several figures.

My invention consists in the employment, for heating the contents of an evaporating-pan, of a steam-heater of novel construction, by which a rapid natural circulation of the liquid or solution to be evaporated over the heating-surfaces is obtained.

To enable others skilled in the art to make and use my invention, I will proceed to describe its construction and operation.

A is an open pan. B C D $a$ $a$ is the heater, made of two conical corrugated plates, B C, of copper, vulcanized iron, or other metal, united by a central ring, D, and external flanges, $a$ $a$, by riveting or otherwise, and furnished with feet $c$ $c$, which rest upon and support it at some distance above the bottom of the pan.

I is the steam-pipe for admitting steam to the heater, and E is the pipe for letting off the water therefrom, the former connected with the heater near the top, and the latter connected at the lowest part and passing through a stuffing-box, $b$, in one side of the pan, outside of which it is intended to be fitted with a trap-valve.

F is an opening in the bottom of the pan for the discharge of the contents thereof when desired, said opening being closed when the pan is in operation by a valve, G, the stem of which passes up through a guide, H, attached to the top of the pan.

J J are wing-pieces attached to the exterior of the heater to keep it in the center of the pan.

The operation of the heater is as follows: The valve G having been closed and the pan filled with the juice or other liquid to be evaporated to a desirable height, steam is admitted to the heater by the pipe I, and circulating freely through it, heats the extensive corrugated surfaces thereof. The steam generated from the liquid in contact with the exterior of the heater in rising or attempting to rise to the surface of the pan causes such a circulation of the liquid as is indicated by the black arrows in Fig. 1—viz., from the upper part of the pan downward into the space outside of the heater, under the bottom thereof, and upward through the central opening, D, thus constantly presenting fresh particles of liquid in contact with the heating-surface, and producing a very rapid evaporation.

What I claim as my invention, and desire to secure by Letters Patent, is—

The employment, in an evaporating-pan, of a conical steam-heater with a central opening and a passage around its exterior and under its bottom, substantially as herein described.

EVAN SKELLY.

Witnesses:
    JEAN ST. JULES,
    OSCAR LAUVE.